(12) United States Patent
Herfert

(10) Patent No.: US 8,636,311 B2
(45) Date of Patent: Jan. 28, 2014

(54) DEVICE AND METHOD FOR THE CONTACTLESS SEIZING OF GLASS SHEETS

(75) Inventor: Christian Herfert, Langweid (DE)

(73) Assignee: Grenzebach Mashinenbau GmbH, Asbach-Baeumenheim (DE)

( * ) Notice: Subject to any disclaimer, the term of this patent is extended or adjusted under 35 U.S.C. 154(b) by 45 days.

(21) Appl. No.: 13/146,852

(22) PCT Filed: Feb. 18, 2010

(86) PCT No.: PCT/DE2010/000187
§ 371 (c)(1),
(2), (4) Date: Jan. 30, 2012

(87) PCT Pub. No.: WO2010/094275
PCT Pub. Date: Aug. 26, 2010

(65) Prior Publication Data
US 2012/0119528 A1   May 17, 2012

(30) Foreign Application Priority Data

Feb. 23, 2009 (DE) .......................... 10 2009 010 164

(51) Int. Cl.
*B25J 15/06* (2006.01)
*B65G 49/06* (2006.01)

(52) U.S. Cl.
USPC ............. 294/64.3; 294/65; 294/185; 294/907

(58) Field of Classification Search
USPC ........... 294/183, 185, 64.3, 65, 907; 414/627, 414/737; 901/40
See application file for complete search history.

(56) References Cited

U.S. PATENT DOCUMENTS 3,223,443 A * 12/1965 Misson ........................... 294/65
3,880,297 A * 4/1975 Martin ........................... 414/793

(Continued)

FOREIGN PATENT DOCUMENTS

CN 101078882 A 11/2007
DE 100 39 482 A1 2/2002

(Continued)

OTHER PUBLICATIONS

Japanese Office Action for Serial No. 2011-543977, Mailed Oct. 23, 2012.

(Continued)

*Primary Examiner* — Dean Kramer
(74) *Attorney, Agent, or Firm* — Brinks Gilson & Lione

(57) ABSTRACT

The invention relates to a method and device for the contactless seizing of glass sheets, characterized in that: a) the device comprises at least one oscillatory, rectangular, plate-shaped oscillating plate (1) comprising an oscillation generator (8), b) each partial surface (9) comprises a central opening for receiving a suction tube (2) which is installed on the upper side and which is used to suction air, c) a circular recess which is connected to the central opening is provided on the lower side of each partial surface (9), d) the plate-shaped oscillating plate (1) is connected to a central damping joint (5) by four connecting supports (7) that are respectively fixed to the suction tube (2) of one partial surface (9) and is assembled in the center of the oscillating plate (1), e) the central damping joint (5) is connected to a central fixation (6), f) a distance sensor and an optical sensor are housed in at least one suction tube.

14 Claims, 5 Drawing Sheets

(56) References Cited

U.S. PATENT DOCUMENTS

| | | | |
|---|---|---|---|
| 5,284,334 A * | 2/1994 | Yamamoto | 271/107 |
| 6,102,459 A * | 8/2000 | Pabst et al. | 294/185 |
| 6,467,825 B1 * | 10/2002 | Wicen | 294/64.3 |
| 6,609,874 B2 | 8/2003 | Höppner et al. | |
| 7,611,180 B1 * | 11/2009 | Fisher et al. | 294/65 |
| 7,870,946 B2 | 1/2011 | Zimmermann et al. | |
| 2007/0275157 A1 | 11/2007 | Cho | |

FOREIGN PATENT DOCUMENTS

| | | |
|---|---|---|
| DE | 103 52 944 A1 | 6/2005 |
| DE | 10 2006 017 763 A1 | 10/2007 |
| DE | 10 2007 016 840 A1 | 10/2008 |
| EP | 1 676 794 A1 | 12/2005 |
| JP | 2000-25948 | 1/2000 |
| JP | 2000-255965 | 9/2000 |
| JP | 2004-519346 | 7/2004 |

OTHER PUBLICATIONS

Chinese Office Action, Application No. 201080003665.8, Dated Dec. 5, 2012 and English Translation.

Prof. Dr.-Ing. Michael Zäh, Prof. Dr.-Ing. Gunther Reinhart, iwb Newsletter, "Sonderforschungsbereich 453: Telepräsente Montage," Technische Universität München, www.iwb.tum.de, Sep. 2007, Jahrgang 15, Nr. 3 ISSN 1434-324X, and English Translation.

Zimmermann & Schilp Handhabungstechnik GmbH, 2008, Hsin Yang Technology Corp., XP-002589146, "Non-Contact Handling," 17 pages.

Verlag Moderne Industrie Ag: Berührungslos Greifen, productronic Dec. 2008, 1 page, and English Translation.

International Search Report for International Application No. PCT/De2010/000187, Dated Aug. 8, 2010.

German Office Action Dated Jul. 28, 2009, and English Translation.

* cited by examiner

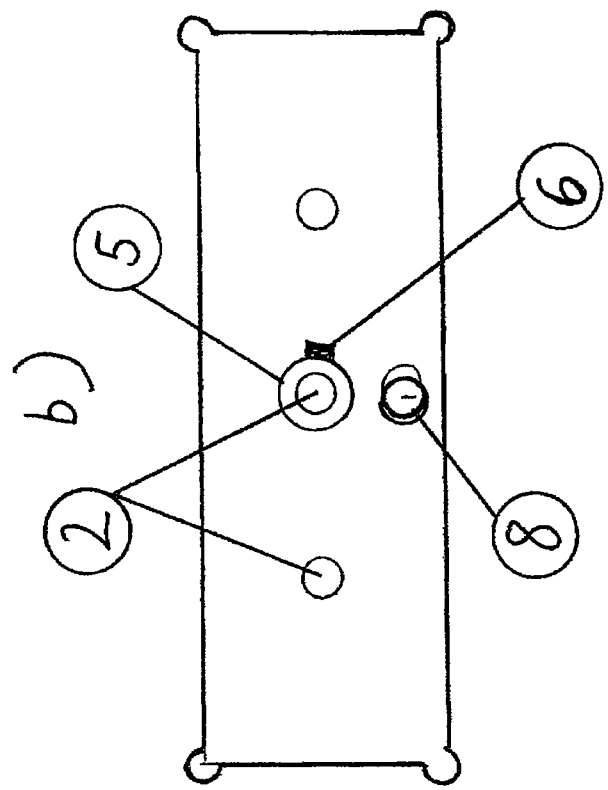
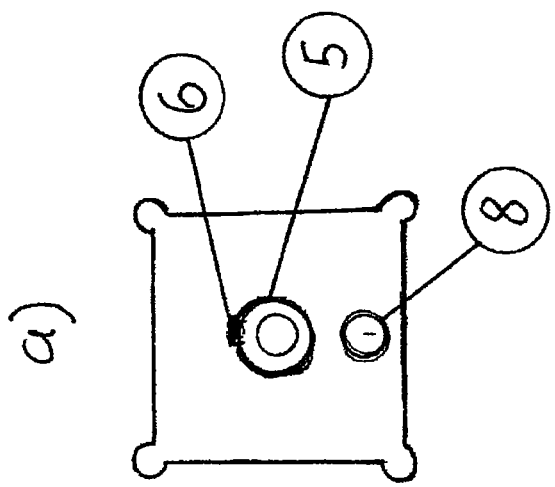
Fig. 3

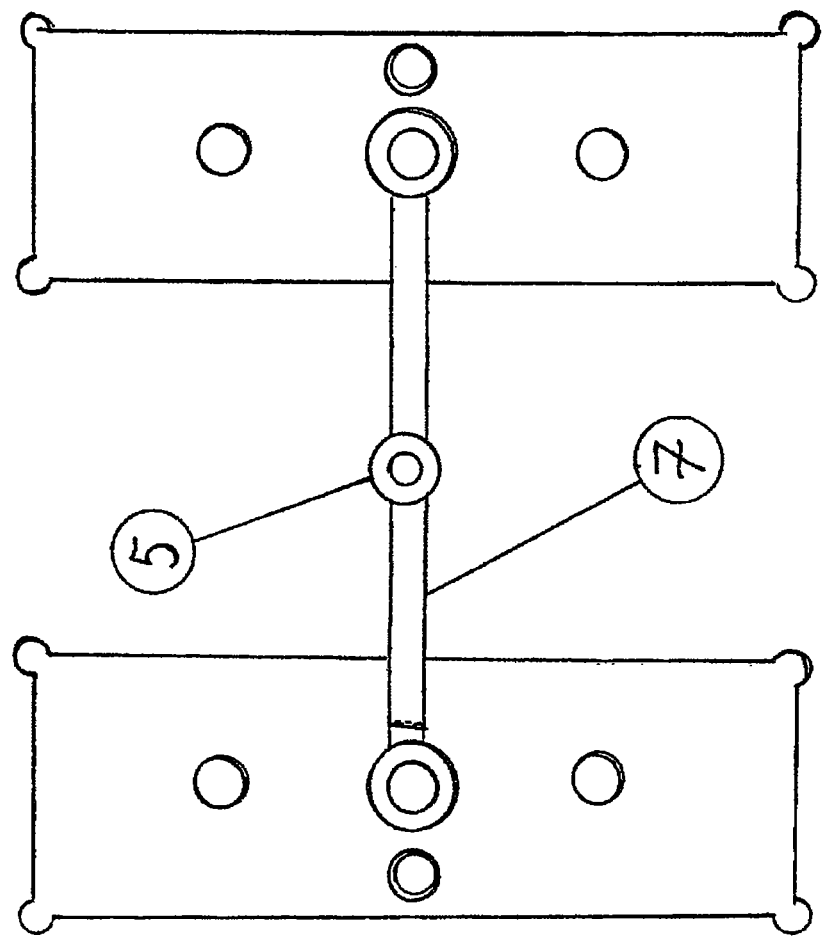

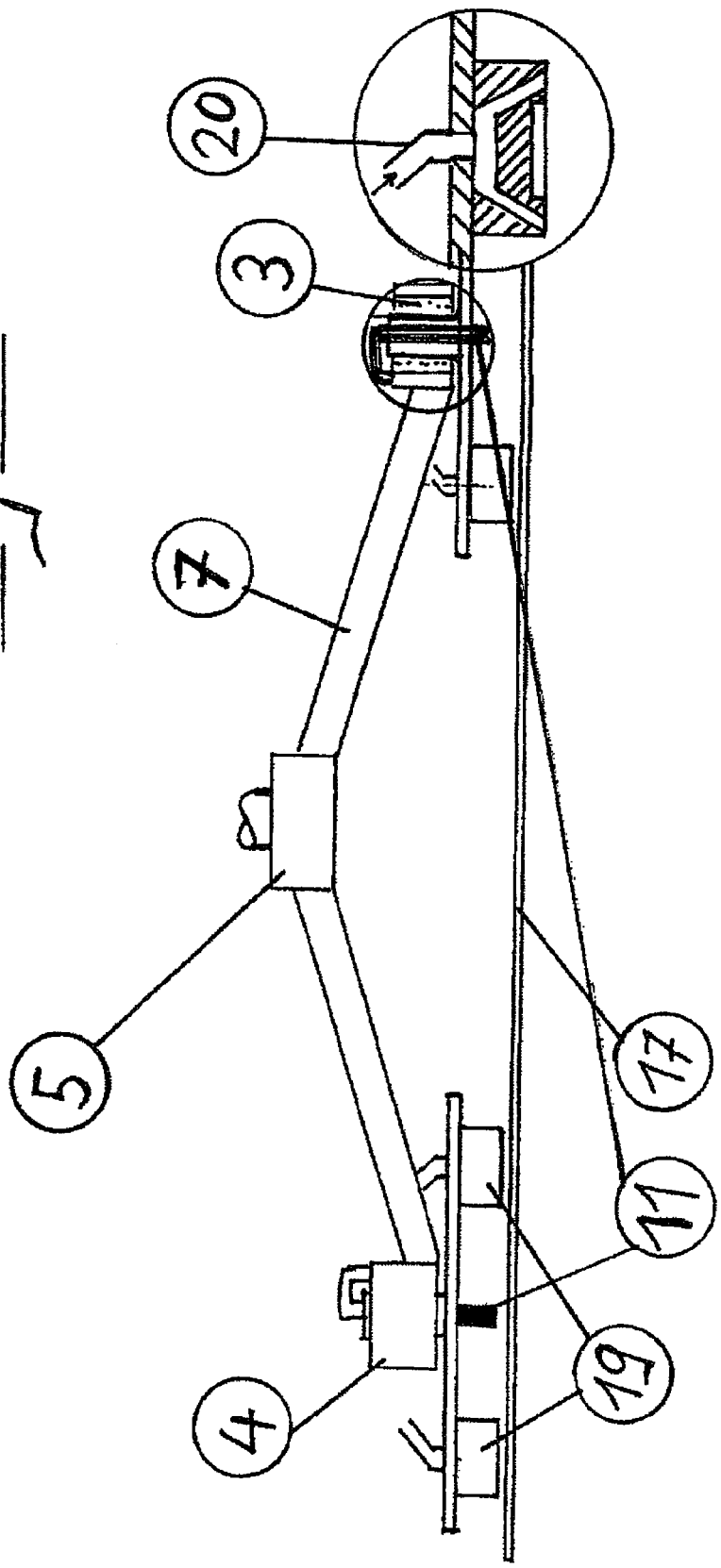

US 8,636,311 B2

DEVICE AND METHOD FOR THE CONTACTLESS SEIZING OF GLASS SHEETS

CROSS REFERENCE TO RELATED APPLICATIONS

This application is a national stage application under 35 U.S.C. 371 of international application number PCT/DE2010/000187 filed Feb. 18, 2010 (WO 2010/094275 A2) and also claims priority to German application number 10 2009 010 164.0 filed Feb. 23, 2009, all of which are hereby incorporated by reference in their entirety.

SUMMARY

This application generally relates to an apparatus and to a method for grasping glass plates, in particular glass plates having a size of several square meters, in a contactless manner. Such glass plates are known, for example, from photovoltaics and are often provided with a touch-sensitive coating.

The following documents appear to be relevant from the prior art.

DE 100 39 482 A1 discloses a handler for transporting flat substrates which are used in the semiconductor industry, in particular wafers, between two stations. The object underlying this handler is to largely avoid contact with a bearing surface during transport.

In order to achieve this object, it is essentially proposed that an oscillation generator for generating longitudinal ultrasonic oscillation interacts with a carrying arm so that a stationary oscillation with at least one oscillation antinode can be set on this carrying arm, said stationary oscillation allowing levitation of a substrate placed on said carrying arm. This document also discloses that means for specifying the position of the substrate for lateral positioning are formed exclusively by an interaction with the edge region of a substrate.

This handler is evidently not suitable for grasping large glass plates in a contactless manner.

DE 103 52 944 A1 describes an apparatus for transporting, handling and bearing components and materials in a contactless manner, wherein essentially a rigid supporting structure, a thin, oscillatory sheet-like element arranged parallel to the supporting structure, and oscillation generating means are proposed in order to generate a hovering state by acoustic levitation of an object over a sound-emitting surface. The object underlying this apparatus is firstly to avoid a bearing using air nozzles and secondly to overcome the discrepancy that exists between the acoustic levitation method and the requirements placed on a transporting path and bearing apparatus. Although DE 103 52 944 A1 describes how metal sheets can be held, fixed and transported in a hovering manner over a surface, the problems of grasping and lifting large glass plates in a contactless manner counter to the force of gravity clearly cannot be solved with this known apparatus.

DE 10 2007 016 840 A1 also discloses an apparatus for transporting and holding touch-sensitive flat objects and materials, said apparatus essentially having a plate-like holder having an oscillation generator and at least two supporting elements. Additional statements, which formulate in principle only one object, are made with regard to the location of the oscillation generator and the supporting elements, and also the frequency of the oscillation generator. The object underlying this apparatus is to provide, by means of acoustic oscillations, technology which is also suitable for transporting and holding not only small-surface-area and light components, such as wafers, for example, but also components which are larger and heavier than those mentioned above.

Glass plates having a size of a square meter are cited as an example here. In this context, DE 10 2007 016 840 A1 points out that the conventional technique that was developed for transporting wafers would in principle also be suitable for transporting larger components if the number of oscillators were increased in a corresponding manner and they were distributed over the entire base surface, to be carried, of the component. However, to this end it would be necessary to have a multiplicity of separate oscillation systems, which would all have to be precisely calibrated with one another. These measures would cause a considerable rise in cost. Apart from that, only transportation in the horizontal direction is possible here. Lifting components counter to the force of gravity is not possible with this apparatus.

This apparatus is not designed and therefore also not suitable for grasping and lifting glass plates having a surface area of several square meters, because glass plates having dimensions of several square meters have extensive unevennesses caused by production conditions and in addition also bend in all directions when lifted in the center, on account of their own weight. These unforeseeable unevennesses in conjunction with the occurrence of sagging at the edges make the use of the apparatus described in DE 10 2007 016 840 A1 impossible.

DE 10 2006 017 763 A1 describes a thin-glass gripper for holding and moving a sheet-like workpiece, comprising a plurality of gripper arms having at least one suction lifter which acts thereon in each case, wherein the gripper arms can be connected to a handling and transfer device via a common connection flange and the suction lifter can be connected to a vacuum line.

The object of this development is to provide a thin-glass gripper which allows gentle handling of various glass formats.

This object is achieved here in that the gripper arms of the thin-glass gripper are oriented radially with respect to the connection flange and are telescopic in their axial direction.

Contactless grasping of the panes of glass is not possible with this thin-glass gripper.

The journal "iwb newsletter", September 2007, Volume 15, No. 3, ISSN 1434-324X, pages 3 and 4 discloses the contactless handling of sensitive components with ultrasonic vacuum grippers. The main articles to be gripped are in this case small and lightweight electronic components such as electrical surface acoustic wave filters.

The contactless handling of large-surface-area glass plates is not dealt with here.

EP 1 676 794 A1 describes a carrying unit which can operate with positive or negative compressed air and can set down the articles being carried quickly and safely. The contactless grasping of large-surface-area glass plates is not discussed here.

The apparatus and the method are generally related to grasping and lifting touch-sensitive glass plates having a surface area size of several square meters in a contactless manner and in an economical and reliable, and also cost-effective manner.

Objects, features and advantages of this application will become readily apparent to persons skilled in the art after a review of the following description, with reference to the drawings and claims that are appended to and form a part of this specification.

The apparatus according to the application is described in more detail in the following text.

BRIEF DESCRIPTION OF THE DRAWINGS

FIG. 3 shows a reduced-size construction of the apparatus;

FIG. 4 shows an alternative configuration of the construction according to FIG. 3b; and FIG. 5 shows an application of Bernoulli flow.

DETAILED DESCRIPTION

The basic functional principle of the apparatus is based on the interaction of ultrasound and negative pressure with respect to the ambient air in the contactless grasping of two-dimensional bodies, in particular glass plates. In this way, contactless lifting of such bodies counter to the force of gravity is possible. To this end, an oscillation generator is used to make a rigid plate oscillate, a negative pressure with respect to the ambient air is generated at certain locations on the underside of this plate, and the plate is in this way connected in a contactless manner to the body to be lifted. Since particular problems occur in the case of grasping and lifting heavy glass plates having a large surface area, the present special apparatus was created.

Figure 1:
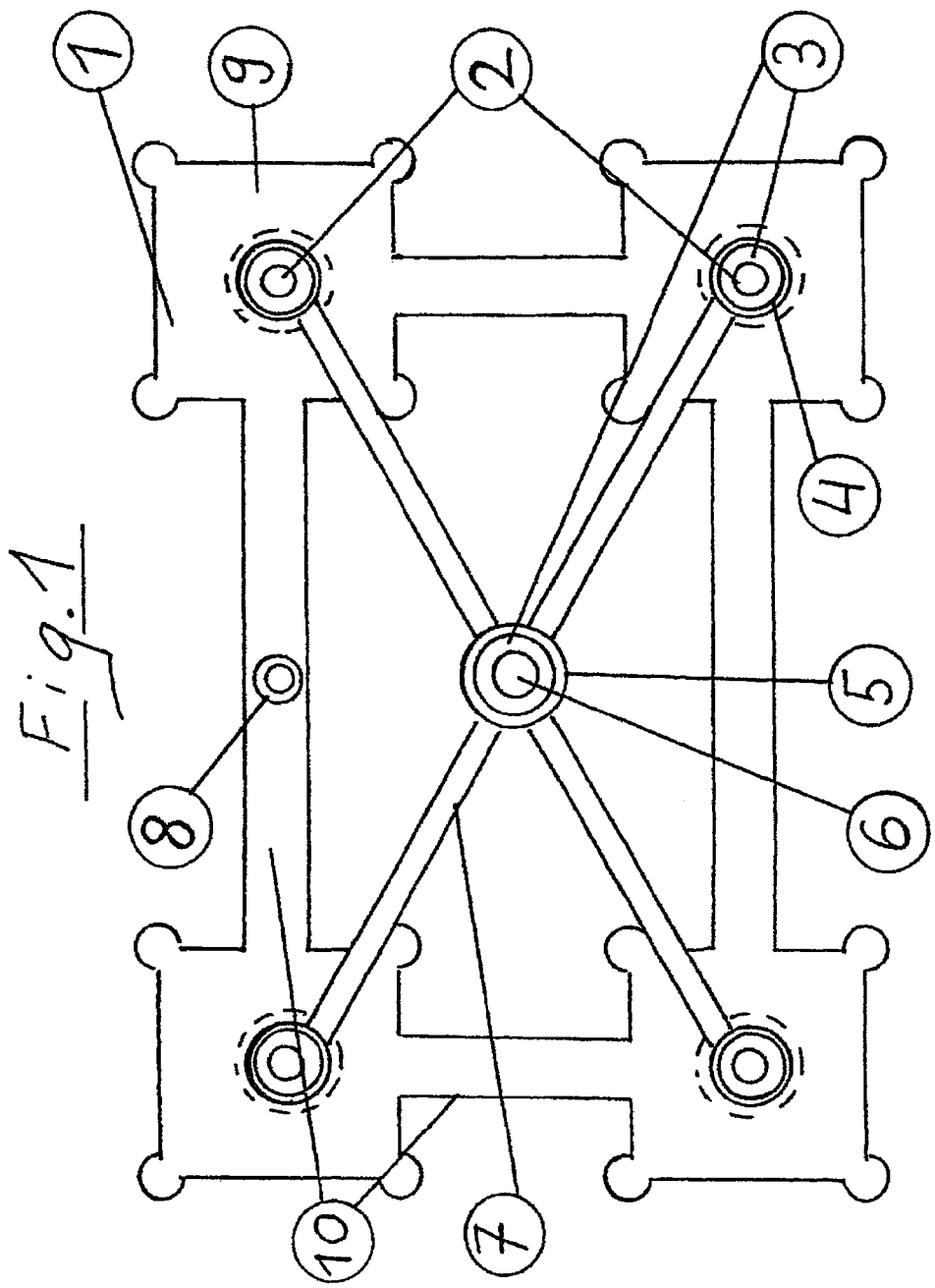
FIG. 1 shows a plan view of an oscillating plate.

FIG. 1 shows a plan view of an oscillating plate 1. The oscillating plate 1 has in this case a rectangular basic form which has in the four corner regions sub-surfaces 9 having an in each case substantially square configuration. The four square sub-surfaces 9 form together with the two long and the two short connecting crosspieces 10 an integral oscillating plate 1, to which an oscillation generator 8 is coupled. At each of their four corners, the four square sub-surfaces 9 have tongue-like protrusions which serve for harmonizing the oscillation characteristics. Each sub-surface 9 has in its center a suction pipe 2 which opens on the underside of the sub-surface 9 in each case into a circular cutout. An elastic material 3 which absorbs the oscillation of the oscillating plate 1 and is surrounded in each case by a holding ring 4 is added concentrically around a suction pipe 2. On each sub-surface 9, the holding ring 4 is connected in each case to a connecting beam 7. All four connecting beams 7 are further connected above the center of the oscillating plate 1 to a central damping joint 5, to which the central attachment 6 is connected. The central damping joint 5 has a further material 3, which damps any remaining oscillation, and is mounted on the central attachment 6 such that it can pivot to all sides.

Since this measure ensures that the oscillating plate 1 as a whole can be adapted to unevennesses in the glass plates. This is because production conditions mean that glass plates having dimensions of several square meters naturally have extensive unevennesses and, on account of their mechanics, such glass plates bend in all directions when lifted in the center, on account of their own weight.

Should particular requirements appear to make it necessary, a further sub-surface 9 having a corresponding suction pipe 2 can be added in the center of the oscillating plate according to FIG. 1, said sub-surface being connected to the oscillating plate 1 via additional transverse crosspieces 10. This is not shown in any figure, since the corresponding configuration appears easy to understand.

Figure 2:
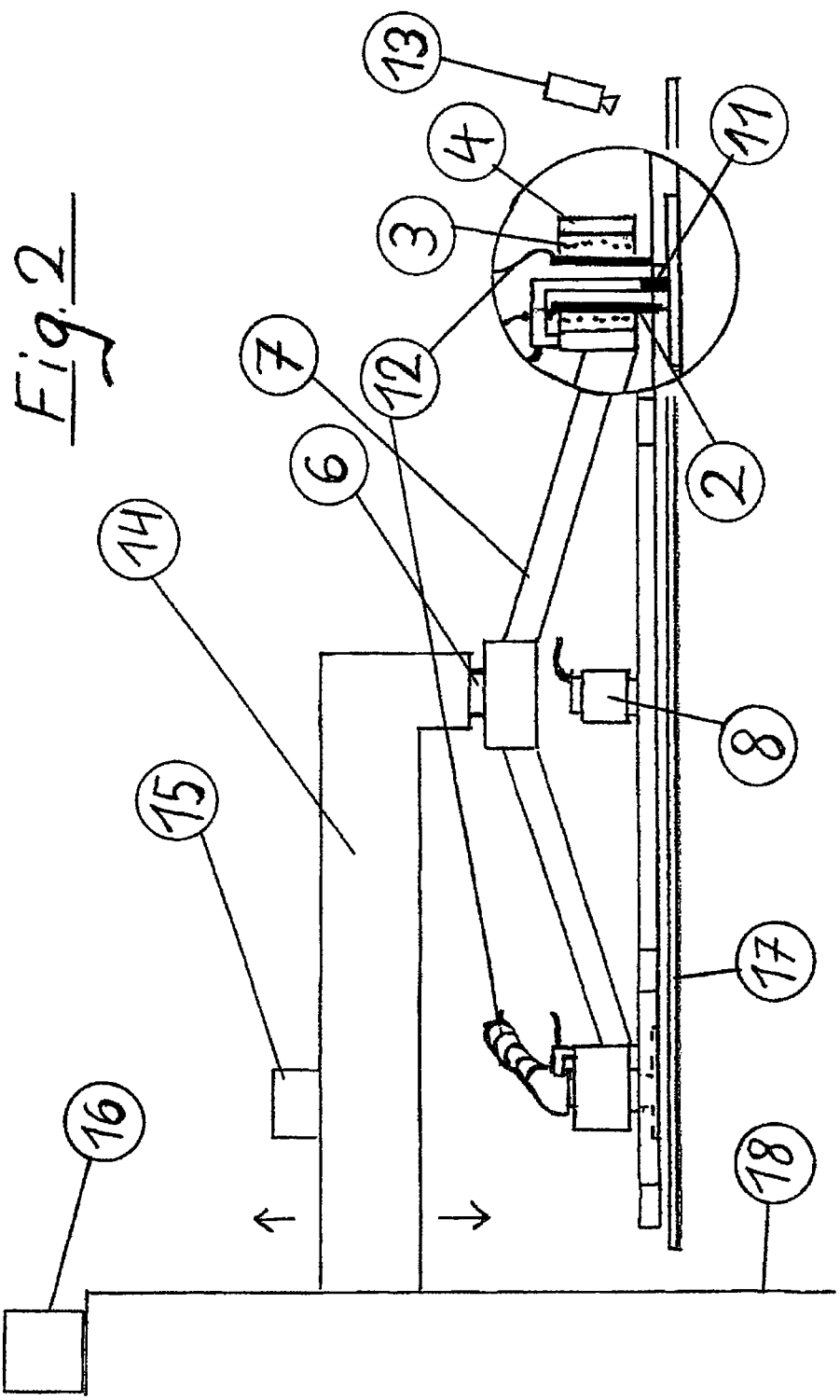
FIG. 2 shows a side view of the oscillating plate in FIG. 1.

The side view according to FIG. 2 illustrates two suction pipes 2, which each have a suction tube 12 and which lead, together with the two further suction pipes 2 and their suction tubes 12, which are not visible in this illustration, to a common, central suction-extraction installation, which is not shown separately.

As an example of one way of lowering the oscillating plate 1 and subsequently lifting the oscillating plate 1 in conjunction with a received glass plate 17, in FIG. 2 the lifting column 18 is illustrated with the carrying arm 14 which carries the apparatus. The servo drive 16 serves for the precise movement of the carrying arm 14. In order to control the servo drive 16, at least one distance sensor 11 is necessary, in particular when the oscillating plate 1 is moved in the direction of the glass plate 17. Said distance sensor 11 sends a necessary feedback signal for the control. As shown in FIG. 2 in the detail—enlargement in the circle drawn around the holding ring 4, such a distance sensor 11 should advantageously be fitted in the opening in the suction pipe 2. It is also advantageous to provide such a distance sensor 11 in each suction pipe 2. As a result, additional information is obtained by means of the output signals to be expected from these sensors 11, said output signals differing in detail. Conclusions about the unevennesses of the glass plate 17 can be drawn, for example, from these differences, it being possible for said conclusions then to be used in the control device 15 and to be evaluated in a central computer. Important parameters for controlling a relatively large installation having a plurality of oscillating plates can in turn be obtained by a central computer from the speed of the change in the output signals from said distance sensors 11 during the movement in the direction of a glass plate. Standard values determined in preliminary trials can be used as parameters for the program structure of the control.

It is further possible to fit optical sensors 13 in one or more suction pipes 2 in order to detect damage to the glass of the glass plate 17 to be lifted. Such sensors usually register the scattered light, caused by damaged glass, of irradiated laser beams. As an example of a further sensor installed outside the glass plate, a sensor 13 is additionally illustrated on the right-hand side in FIG. 2. The selection, arrangement and activation of such sensors depends on the configuration of the respective installation. This task is familiar to a person skilled in the art.

FIG. 3 illustrates reduced-size constructions of the apparatus. Thus, the oscillating plate shown in FIG. 3a corresponds to a sub-surface 9 of the connection of four sub-surfaces 9 shown in FIG. 1. Since very different formats can occur in the contactless grasping of large glass plates, it is necessary, in order to grasp a, for example long but narrow, glass plate to use a plurality of apparatuses in succession. For this purpose, a plurality of oscillating plates according to FIG. 3a can be used in order to manage this task. Depending on the length of such a glass plate, it may also suffice to use one oscillating plate according to FIG. 3b.

The tongue-like protrusions should then be provided at the corners of the entire configuration present.

However, it can also prove expedient to use a combination of oscillating plates from FIG. 3a and FIG. 3b in order to grip a glass plate having a complex structure in a contactless manner.

However, for these cases, the oscillating plates in question each have a separate oscillation generator 8 and a separate suction pipe 2.

FIG. 4 shows an alternative to the construction according to FIG. 3b. Here, two oscillating plates in the configuration of FIG. 3b are connected by means of a connecting beam 7 for the case of a particularly wide glass plate. In the center of this construction, the central damping joint 5 is illustrated as part of a lifting apparatus.

FIG. 5 shows an application of Bernoulli flow. According to Bernoulli's law, it is known that the flow rate of an incompressible fluid flowing through a pipe behaves in an inversely proportional manner to a changing pipe cross section. It follows from this that, in the detail shown in the circle in FIG. 5, a negative pressure is produced at the underside in relation to the compressed air blown in at the top. According to this principle, it is likewise possible, as shown in cross section in FIG. 5 in analogy to FIG. 2, to lift a glass plate 17 counter to the force of gravity. For this case, too, the rotary joint 5 is necessary in conjunction with the indicated sensor 11 for achieving the object underlying the application.

A further levitation principle consists in the targeted arrangement of outlet openings, for conveying supply air and waste air, of an apparatus. This can lead to equilibrium of both air flows and this equilibrium can be used for the purposes of levitation. This effect can be used in conjunction with a plate which, in a similar manner to in the case of the Bernoulli-grippers described, has, instead of suction pipes, a combination of supply air pipes and suction pipes which can be connected by means of recessed flow ducts. The applicant reserves the right to direct additional claims to such an apparatus or such a method.

Since the apparatus can be used as part of a large production installation, in which glass plates of very different formats having a usually sensitive surface coating have to be grasped in a contactless manner in quick succession, it is recommended in this case to make available a magazine of oscillating plates of very different sizes. The apparatuses, which are necessary for this purpose, of the oscillating plates to be provided on the production line and the lifting and transporting installations connected thereto therefore require in addition a multiplicity of sensors and control elements.

The interactive control of the movement elements and sensors used in each case requires a specific control program which may be implemented in program code and executed by a computer or stored on a machine readable storage medium.

As a person skilled in the art will readily appreciate, the above description is meant as an illustration of implementation of the principles this application. This description is not intended to limit the scope of this application in that the invention is susceptible to modification, variation and change, without departing from the spirit of this application, as defined in the following claims.

LIST OF REFERENCES (1) Oscillating plate
(2) Suction pipe
(3) Elastic material
(4) Holding ring
(5) Central damping joint
(6) Central attachment
(7) Connecting beam
(8) Oscillation generator
(9) Sub-surface
(10) Connecting crosspiece
(11) Distance sensor
(12) Suction tube
(13) Optical sensor (Damaged glass sensor)
(14) Carrying arm
(15) Control device
(16) Servo drive of a lifting apparatus
(17) Glass plate
(18) Lifting column
(19) Bernoulli gripper
(20) Compressed air line

The invention claimed is:

1. An apparatus for grasping glass plates, the glass plates having a size of several square meters, in a contactless manner, having the following features:
   a) at least one oscillatory, rectangular, oscillating plate having at least one oscillation generator, wherein the four corners of the oscillating plate are each formed by a square sub-surface, and wherein each of these sub-surfaces has protrusions at its four corners, and wherein the sub-surfaces are connected together by crosspieces,
   b) each sub-surface has a central opening for receiving a suction pipe, installed on the upper side, for the suction extraction of air,
   c) provided on the underside of each sub-surface is a circular cutout which is connected to the central opening,
   d) the oscillating plate is connected to a central damping joint, which can pivot to all sides about a central attachment, via four connecting beams which are each secured to the suction pipe of a sub-surface via a holding ring and are brought together in the center of the oscillating plate,
   e) the central damping joint is connected to the central attachment in order to decouple an oscillation from the at least one oscillation generator, and
   f) a distance sensor for controlling a servo drive for moving the oscillating plate in the direction of the glass plate is accommodated in at least one suction pipe.

2. The apparatus as claimed in claim 1, wherein at least one optical sensor for detecting damage to the glass of a glass plate to be lifted is accommodated in at least one suction pipe or in the region outside a glass plate.

3. An apparatus for grasping glass plates, the glass plates having a size of several square meters, in a contactless manner, having the following features:
   a) at least one oscillatory, square, oscillating plate having at least one oscillation generator, wherein the oscillating plate has protrusions at its four corners,
   b) the oscillating plate has an opening for receiving a suction pipe, installed on the upper side, for the suction extraction of air,
   c) provided on the underside of the oscillating plate is a circular cutout which is connected to the opening,
   d) the oscillating plate is connected at the suction pipe to a connecting beam via a holding ring and is connected to a central damping joint which can pivot to all sides about a central attachment, and
   e) a distance sensor for controlling a servo drive for moving the oscillating plate in the direction of the glass plate is accommodated in the suction pipe.

4. The apparatus as claimed in claim 3, wherein at least one optical sensor for detecting damage to the glass of a glass plate to be lifted is accommodated in at least one suction pipe or in the region outside a glass plate.

5. An apparatus for grasping glass plates, the glass plates having a size of several square meters, in a contactless manner, having the following features:
   a) at least one oscillatory, rectangular, oscillating plate having at least one oscillation generator, wherein the oscillating plate has protrusions at its four corners,
   b) the oscillating plate has at least two openings for receiving in each case a suction pipe, installed on the upper side, for the suction extraction of air,
   c) provided on the underside of the oscillating plate are at least two circular cutouts which are each connected to the at least two openings,
   d) the oscillating plate is connected at a central suction pipe to a connecting beam via a holding ring and is connected to a central damping joint which can pivot to all sides about a central attachment, and
   e) a distance sensor for controlling a servo drive for moving the oscillating plate in the direction of the glass plate is accommodated in the suction pipe.

6. The apparatus as claimed in claim 5, wherein at least one optical sensor for detecting damage to the glass of a glass plate to be lifted is accommodated in at least one suction pipe or in the region outside a glass plate.

7. An apparatus for grasping glass plates, the glass plates having a size of several square meters, in a contactless manner, having the following features:
- a) at least two oscillatory, rectangular, oscillating plates each having at least one oscillation generator, wherein each oscillating plate has protrusions at its four corners,
- b) each oscillating plate has at least two openings for receiving in each case a suction pipe, installed on the upper side, for the suction extraction of air,
- c) provided on the underside of each oscillating plate are at least two circular cutouts which are each connected to the at least two openings,
- d) the oscillating plates are each connected together via a connecting beam at a central suction pipe via a holding ring and said connecting beam is in turn connected via a central damping joint to a central damping joint which can pivot to all sides about a central attachment,
- e) the central damping joint is connected to the central attachment in order to decouple an oscillation from the at least one oscillation generator, and
- f) a distance sensor for controlling a servo drive for moving the oscillating plate in the direction of the glass plate is accommodated in each of the suction pipes.

8. The apparatus as claimed in claim 7, wherein at least one optical sensor for detecting damage to the glass of a glass plate to be lifted is accommodated in at least one suction pipe or in the region outside a glass plate.

9. A method for grasping glass plates, the glass plates having a size of several square meters, in a contactless manner, having the following features:
- a) at least one oscillation generator is used to make a rigid plate oscillate over a glass plate to be grasped and a negative pressure with respect to the ambient air is generated at certain locations on the underside of this plate,
- b) the oscillating plate is lowered into the vicinity of the glass plate in response to a distance sensor until a force-fitting connection between the oscillating plate and the glass plate is achieved,
- c) the oscillating plate is lifted together with the glass plate,
- d) the oscillating plate is set down at the target location together with the glass plate,
- e) the at least one oscillation generator and the negative pressure at the oscillating plate are switched off and transferred to a new point of use.

10. The method as claimed in claim 9, wherein the oscillating plate is lowered onto a glass plate via at least one distance sensor, wherein the latter is advantageously fitted in the opening of a suction pipe and wherein motion parameters for controlling a plurality of oscillating plates can be obtained by a central computer from the speed of the change in the output signals from said distance sensors during the movement in the direction of a glass plate.

11. The method as claimed in claim 10, wherein in order to adapt to unevennesses in a glass plate, an oscillating plate is mounted to a central damping joint on a central attachment such that the oscillating plate can pivot to all sides about the central attachment and thus the oscillating plate can be adapted to unevennesses in the glass plates.

12. The method as claimed in claim 9, wherein a magazine of oscillating plates of very different sizes is made available for operation in a large manufacturing installation.

13. The method as claimed in claim 9, further comprising inspecting the glass plate with at least one optical sensor to detect damage to the glass plate.

14. The method as claimed in claim 13, wherein the at least one optical sensor is disposed in at least one suction pipe, the suction pipe being used to generate the negative pressure.

* * * * *

UNITED STATES PATENT AND TRADEMARK OFFICE
CERTIFICATE OF CORRECTION

PATENT NO. : 8,636,311 B2
APPLICATION NO. : 13/146852
DATED : January 28, 2014
INVENTOR(S) : Christian Herfert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 203 days.

Signed and Sealed this
Twenty-second Day of September, 2015

Michelle K. Lee
*Director of the United States Patent and Trademark Office*